United States Patent
Erndt et al.

(10) Patent No.: US 12,296,496 B2
(45) Date of Patent: May 13, 2025

(54) METHOD OF MANUFACTURING A HAIR CUTTER

(71) Applicant: Braun GmbH, Kronberg (DE)

(72) Inventors: Andreas Erndt, Kelkheim (DE); Thorsten Piesker, Friedrichsdorf (DE); Wolfgang Stegmann, Moerfelden (DE); Bernhard Sikora, Kelkheim (DE)

(73) Assignee: Braun GMBH, Kronberg (DE)

( * ) Notice: Subject to any disclaimer, the term of this patent is extended or adjusted under 35 U.S.C. 154(b) by 5 days.

(21) Appl. No.: 18/199,395

(22) Filed: May 19, 2023

(65) Prior Publication Data
US 2023/0373115 A1    Nov. 23, 2023

(51) Int. Cl.
*B26B 19/38*    (2006.01)
*B21D 26/033*    (2011.01)

(52) U.S. Cl.
CPC ........ *B26B 19/3893* (2013.01); *B21D 26/033* (2013.01)

(58) Field of Classification Search
CPC ............ B26B 19/3893; B26B 19/3853; B21D 26/033; B21D 26/043; B21D 51/16; B21D 53/00; A61C 17/22; A61C 17/225
USPC .......... 30/29.5; 29/428, 592; 132/55; D28/9, D28/44
See application file for complete search history.

(56) References Cited

U.S. PATENT DOCUMENTS

| | | | | |
|---|---|---|---|---|
| 2,282,748 A * | 5/1942 | Rand, Jr. | ................. | B26B 19/38 30/34.2 |
| 2,290,326 A * | 7/1942 | Hanley | ................... | B26B 19/38 30/223 |
| 2,561,241 A * | 7/1951 | Streng | ..................... | B26B 19/38 D28/51 |
| 3,524,253 A * | 8/1970 | Hoke | .................... | B26B 19/148 30/29.5 |
| 7,013,697 B2 * | 3/2006 | Barber | ................. | B21D 26/033 72/58 |
| 8,194,471 B2 * | 6/2012 | Widjaja | .................. | G11C 11/39 365/189.04 |
| 8,196,303 B2 * | 6/2012 | Baron | ................. | B26B 19/3853 30/43.6 |

(Continued)

FOREIGN PATENT DOCUMENTS

DE    10161088 A1    6/2003
DE    10215804 A1    11/2003

(Continued)

OTHER PUBLICATIONS

Unpublished U.S. Appl. No. 18/199,398, filed May 19, 2023 to Wolfgang Stegmann et al.

(Continued)

*Primary Examiner* — Lawrence Averick
(74) *Attorney, Agent, or Firm* — Andrés E. Velarde; Gerd Zetterer

(57) ABSTRACT

The present invention relates a method of manufacturing a hair cutting device with an outer metal shell, comprising the steps of forming the outer metal shell into a desired shape and mounting functional components for performing or helping to perform a personal care treatment into and/or onto said formed outer metal shell. Said forming the outer metal shell includes a hydraulic pressure forming step.

17 Claims, 11 Drawing Sheets

(56) References Cited

U.S. PATENT DOCUMENTS

| | | | |
|---|---|---|---|
| 8,534,107 B2* | 9/2013 | Golovashchenko | B21D 26/12 72/58 |
| 8,567,223 B2* | 10/2013 | Golovashchenko | B21D 26/041 72/58 |
| 8,621,904 B2* | 1/2014 | Mizumura | B21D 26/041 72/58 |
| 9,174,351 B2* | 11/2015 | Binder | B26B 19/388 |
| 9,579,705 B2* | 2/2017 | Park | B21D 26/035 |
| 9,692,199 B2* | 6/2017 | Liu | B21C 37/0815 |
| 9,950,434 B2* | 4/2018 | Binder | H04N 23/69 |
| 10,059,013 B2* | 8/2018 | Skuhra | B26B 19/3853 |
| 10,518,427 B2* | 12/2019 | Skuhra | B26B 19/28 |
| 11,570,347 B2* | 1/2023 | Binder | H04N 21/41407 |
| 11,731,295 B2* | 8/2023 | Arndt | B26B 19/3853 30/199 |
| 11,945,020 B2* | 4/2024 | Matsumoto | B21D 26/043 |
| 11,945,503 B2* | 4/2024 | Alvarez | B23K 26/24 |
| 2004/0156737 A1* | 8/2004 | Rakowski | C22C 38/44 420/586.1 |
| 2004/0231160 A1 | 11/2004 | Shiba et al. | |
| 2004/0231395 A1* | 11/2004 | Barber | B21D 26/033 72/370.06 |
| 2004/0255463 A1 | 12/2004 | Kiehl | |
| 2006/0156551 A1* | 7/2006 | Khubani | B26B 19/3813 30/130 |
| 2007/0107230 A1* | 5/2007 | Baron | B26B 19/14 30/43.6 |
| 2010/0186234 A1* | 7/2010 | Binder | B26B 19/3873 348/E5.022 |
| 2010/0186477 A1 | 7/2010 | Barthelemy et al. | |
| 2011/0067470 A1* | 3/2011 | Golovashchenko | B21D 26/041 72/62 |
| 2011/0120203 A1* | 5/2011 | Mizumura | B21D 26/041 72/18.6 |
| 2012/0312060 A1* | 12/2012 | Golovashchenko | B21D 26/033 72/54 |
| 2012/0317817 A1* | 12/2012 | Binder | H04N 5/262 30/34.05 |
| 2012/0320180 A1* | 12/2012 | Binder | B26B 19/48 348/333.01 |
| 2015/0114064 A1* | 4/2015 | Park | B21D 26/033 72/62 |
| 2016/0008994 A1* | 1/2016 | Johnson | B26B 19/06 30/341 |
| 2016/0094001 A1* | 3/2016 | Liu | B21D 26/033 29/874 |
| 2016/0175912 A1 | 6/2016 | Priem et al. | |
| 2017/0164426 A1* | 6/2017 | Rakowski | C22C 38/44 |
| 2017/0305021 A1* | 10/2017 | Skuhra | B26B 19/3866 |
| 2018/0085942 A1 | 3/2018 | Perez Lopez et al. | |
| 2019/0126501 A1* | 5/2019 | Skuhra | B26B 19/06 |
| 2020/0262092 A1 | 8/2020 | Perez Lopez et al. | |
| 2020/0282579 A1* | 9/2020 | Binder | H04N 7/185 |
| 2020/0353983 A1* | 11/2020 | Alvarez | C22C 38/32 |
| 2021/0220101 A1 | 7/2021 | Jungnickel et al. | |
| 2022/0168795 A1* | 6/2022 | Matsumoto | B21D 26/043 |
| 2022/0184827 A1* | 6/2022 | Arndt | B26B 19/205 |
| 2023/0399051 A1* | 12/2023 | Alvarez | C21D 9/505 |

FOREIGN PATENT DOCUMENTS

| | | |
|---|---|---|
| EP | 2319634 B1 | 9/2014 |
| JP | 2007101509 A | 4/2007 |
| WO | 0123116 A1 | 4/2001 |
| WO | 2016005142 A1 | 1/2016 |
| WO | 2016053258 A1 | 4/2016 |
| WO | 2020014956 A1 | 1/2020 |

OTHER PUBLICATIONS

Unpublished U.S. Appl. No. 18/199,396, filed May 19, 2023 to Andreas Erndt et al.
Unpublished U.S. Appl. No. 18/199,400, filed May 19, 2023 to Andreas Erndt et al.
Extended EP Search Report and Search Opinion for 23174240.4 dated Nov. 20, 2023, 15 pages.
PCT Search Report and Written Opinion for PCT/IB2023/055189 dated Sep. 7, 2023, 19 pages. 18 Pages.

* cited by examiner

Front view

Side view a)

b)

a)

b)

a) 
Insert the pipe into the tool b) 
Closing the mold c) 
Inject fluid inside the metal tube d) 
Axial force is applied at the ends of the tube e) 
Removal of the part a)

b)

c)

d)

METHOD OF MANUFACTURING A HAIR CUTTER

FIELD OF THE INVENTION

The present invention relates to a method of manufacturing a personal care device such as a hair cutter with an outer metal shell, comprising the steps of forming the outer metal shell into a desired shape and mounting functional components for performing or helping to perform a personal care treatment into and/or onto said formed outer metal shell. The personal care device may include a handle and a function head such as a cutter head or brush head attached thereto, wherein at least one of the handle and the function head includes said outer metal shell which may be part of a housing accommodating functional components such as electronics, an electric drive unit including a motor and a mechanical transmitter, or power supply or storage component such as batteries. The personal care device also may include a base station for loading and/or cleaning and/or parking the handheld device, wherein the base station also may include such outer metal shell which may be part of a housing accommodating functional components such as electronics, a power supply or cleaning tools.

BACKGROUND OF THE INVENTION

Hand-held personal care devices may effect various personal care functions such as hair cutting, shaving, skin treatment, tooth brushing and cleaning, nail trimming or other personal care treatments. Usually, the handles of such personal care devices have a double function, wherein—on the one hand—the handle is the gripping portion for gripping and holding the personal care device by hand and, on the other hand, the handle accommodates or supports functional components such as an electric drive unit for driving personal care tools such as hair cutting tools, a brush unit, skin pealing or massaging tools, nail polishing tools or other personal care tools. More particularly, the handle may form a housing in which an electric motor and a mechanical transmitter for transmitting the drive motion of the motor to a personal care tool, and, furthermore, electronic control equipment and electrical powering equipment such as batteries, a net supply terminal and information equipment such as displays may be accommodated. The handle may be water-tight and/or sealed against moisture and/or dust to protect the functional components accommodated in the housing.

The function head of such personal care devices usually supports the personal care tool or a plurality of personal care tools such as a shear foil cutter, long hair cutters and trimmers, or one or more brush units, interdental cleaner etc., wherein such personal care tools may be supported movably relative to a frame or shell of the function head, wherein a mechanical transmitter may connect the movably supported tools to the drive unit in the handle.

The base station may receive or may be connected to the hand-held personal care device for loading and/or cleaning and/or parking the handheld device, wherein the base station's housing usually accommodates functional components such as electronics like data processors and a display for communicating with the hand-held device, a power supply with electric connectors for charging the hand-held device, or cleaning tools such as a washer for cleaning the function head of the hand-held device.

Usually, the outer shells of the handle, the function head and the base station are mainly made from plastic, wherein a plurality of plastic parts such as hard plastic parts and soft plastic parts may be mounted to each other to form the outer shell.

On the other hand, the handle and/or the function head may include an outer metal shell which may form the outer surface of the handle to be gripped by hand or fingers and/or may form at least a part of a housing accommodating the aforementioned functional components and/or may form a frame for supporting personal care tools of the function head. Such metal shells, when forming the outer surface of the handle and/or the function head, may provide for a cool touch feeling for the user and possesses high strength, rigidity and high resistance against wear and tear, scratches, and chemical environments. In addition, outer metal shells provide for a precious esthetical look and a clean appearance.

When mounting functional components into and/or onto such outer metal shell, it is quite difficult to allow for easy and precise manufacturing of the metal shell on the one hand and allow for easy assembling of the personal care device including mounting the functional components on the other hand, in particular when the outer metal shell has a tight fit and small dimensions despite the functional components to be accommodated inside the metal shell. In addition, openings and perforations in the metal shell used for inserting functional components or giving access to functional components such as displays, controllers or switches or connectors such as loading cable terminals, may have sharp and burred edges.

Meeting such diverging needs becomes even more difficult when the outer shell should have a hollow shape and be made in one piece with an integral, homogenous, seamless structure. Such one-piece structure without visible seams like welding seams between different shell parts are not only desired from an esthetical point of view, but also increases strength and rigidity and reduces mounting steps. However, such one-piece structure with a hollow ring-like or sleeve-like shape necessitates at least one opening through which the aforementioned functional components such as electronics, drive units or batteries or mechanical transmitters can be inserted or through which access to internal components is possible. Providing large opening facilitates the mounting process, but reduces strength, whereas small openings do not allow for easy mounting. In any case, it is difficult to achieve a tight fit of the metal shell with the functional components without compromising an ergonomic shape and an esthetically pleasing, three-dimensional complex appearance.

SUMMARY OF THE INVENTION

It is an objective underlying the present invention to provide for an improved method of manufacturing a hair cutter device including an outer metal shell and/or metal housing.

A further objective underlying the invention is to provide for an improved method of manufacture having an outer metal shell for such personal care device combining a small footprint and tight fit with functional components mounted into and/or onto the metal shell and easy mounting of said functional components, without sacrificing a functional shape of the outer metal shell providing for rigidity and ergonomic handling.

A still further object underlying the present invention is to provide for an improved manufacturing method for manufacturing an outer metal shell of a personal care device, allowing for precise forming of the metal shell despite complex three-dimensional shapes thereof, without necessitating a high number of processing steps with complicated, expensive tools.

At least one of the aforementioned objectives is solved by a method having the features of claim 1. Advantageous further features are set forth with the subclaims.

At least one of the aforementioned objectives is achieved by a method of manufacturing a hair cutter with an outer metal shell, comprising the steps of: forming the outer metal shell into a desired shape, into one integral piece with a homogenous, seamless structure and a hollow, elongated, closed ring or closed sleeve shape, wherein said forming step includes positioning a hollow, sleeve-like or pipe-like metal shell blank in a cavity of a mold surrounding an outer side of said metal shell blank, wherein a hydraulic pressure is applied to an inner side of the hollow metal shell blank, thereby expanding the hollow metal shell blank and pressing the metal shell blank, with an outer side, against the contour of the cavity of the mold so the outer side of the metal shell blank adopts the contour of the mold, creating frontal openings at opposite axial end portions and preferably at least one lateral opening or perforation at an intermediate side portion at the formed outer metal shell, and mounting functional components and/or modules for performing or helping to perform a personal care function into and/or onto said formed outer metal shell.

To achieve at least one of the aforementioned objectives, it is suggested to form the outer metal shell at least in part by means of hydraulic pressure deforming the metal shell into the desired shape. More particularly, forming the outer metal shell includes a hydraulic pressure forming step applying hydraulic pressure onto a side of a metal shell blank positioned in a mold to deform the metal shell blank and press an opposite side of the metal shell blank against said mold to adopt a contour of the mold, thereby forming the outer metal shell with the desired shape. Such hydraulic pressure forming step allows for deforming the metal shell blank into complex three-dimensional shapes without having the problem of getting mechanical forming tools such as punches, pusher, or movable core elements out of the concavities of the metal shell.

Openings are created within a thus formed metal shell which may be equipped with functional components or modules mounted therein and/or thereon. This allows for creating a series of devices being equipped with different functional components or modules inserted into those openings and based on the same metal shell housing. Said outer metal shell is formed with an intermediate section between said opposite end portions including at least two lateral openings and/or lateral perforations for accessing or connecting with said functional components accommodated inside or outside said outer metal shell.

Said functional component or modules comprises at least three, four, five or all of the following: a drive unit, charging connectors provided at a bottom end portion, charging connectors provided at the lateral opening, a display provided at a lateral opening, a hair cutting tool provided at a top end portion and/or a special treatment tool provided at the lateral side or the bottom end of the outer metal shell.

More particularly, the outer metal shell may include one or more undercuts which easily can be formed by applying hydraulic pressure onto the shell portions desired to have such undercut shape, wherein forming such undercuts by hydraulic pressure is also easily possible when the outer metal shell is formed in one piece with a homogenous, integral and seamless structure having a closed ring-like or closed sleeve-like shape. For example, a substantially tubular, elongated outer metal shell of a handle or a hollow sleeve-like outer shell of a function head of a personal care device or another hollow outer metal shell of a personal care device accessory like a loading station may be formed by applying hydraulic pressure onto an inside surface of a substantially tubular metal shell blank to form the outer metal shell having an intermediate section defining a maximum cross-sectional area and a pair of end portions arranged on opposite sides of said intermediate shell section and having smaller cross-sectional areas then said bulging intermediate section.

Irrespective of the details of the shape of the outer metal shape, a metal shell blank having a hollow, sleeve-like or pipe-like shape may be positioned in a cavity of the mold which surrounds an outer side of the hollow metal shell blank, wherein the hydraulic pressure may be applied to an inner side of the hollow metal shell blank, thereby expanding the hollow metal shell blank and pressing the metal shell blank, with an outer side thereof, against the contour of the cavity of the mold so the outer side of the metal shell blank adopts the contour of the mold cavity.

Said hydraulic pressure forming step may be a hydroforming step, wherein the metal shell blank in the mold and/or the mold is filled with a hydraulic fluid such as water or oil, wherein pressure is applied to the hydraulic fluid from a pressure source outside the mold.

In addition to or in the alternative to such hydroforming step, an electro-hydraulic forming step may be provided, wherein the metal shell blank is positioned in a hydraulic fluid reservoir and/or submerged into the hydraulic fluid in which one or more pressure waves are generated by means of, for example, at least one pair of electrodes, said one or more pressure waves forming the metal shell blank into the desired shape of the outer metal shell. More particularly, such pressure waves may deform the metal shell blank in a mold to press the metal shell blank against a mold contour to adopt such mold contour.

In addition, or in the alternative to such hydroforming or electro-hydraulic forming step, the metal shell blank also may be deformed by electro-magnetic forming, wherein a metal shell blank made of a magnetically responsive material may be used and may be subject to a magnetic field that may be generated by an electro-magnetic device. More particularly, a magnetic field may be applied to the metal shell blank to transform said metal sheet blank into a viscoplastic state and to deform the metal shell blank to adopt a mold contour. Such electro-magnetic forming allows forming of complex shapes at high speeds in cold conditions.

These and other advantages become apparent from the following description giving reference to the drawings and possible examples.

DETAILED DESCRIPTION OF THE INVENTION

Figure 1:
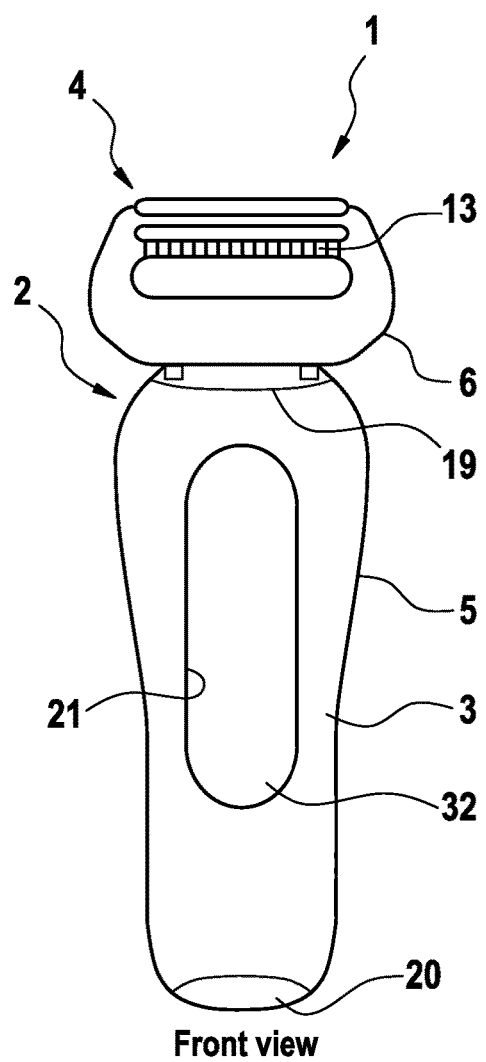
FIG. 1: a front view of a personal care device in terms of an electric shaver including a handle including an outer metal shell and a function head in terms of a shaver head including a metal shell supporting hair cutting tools including a shear foil cutter and a long hair cutter.

According to an aspect, it is suggested to form the outer metal shell at least in part by means of hydraulic pressure deforming the metal shell into the desired shape. More particularly, forming the outer metal shell includes a hydraulic pressure forming step applying hydraulic pressure onto a side of a metal shell blank positioned in a mold to deform the metal shell blank and press an opposite side of the metal shell blank against said mold to adopt a contour of the mold, thereby forming the outer metal shell with the desired shape. Such hydraulic pressure forming step allows for deforming the metal shell blank into complex three-dimensional shapes without having the problem of getting mechanical forming tools such as punches, pusher, or movable core elements out of the concavities of the metal shell.

More particularly, the outer metal shell may include one or more undercuts which easily can be formed by applying hydraulic pressure onto the shell portions desired to have such undercut shape, wherein forming such undercuts by hydraulic pressure is also easily possible when the outer metal shell is formed in one piece with a homogenous, integral, and seamless structure having a closed ring-like or closed sleeve-like shape.

For example, a substantially tubular, elongated outer metal shell of a handle or a hollow sleeve-like outer shell of a function head of a personal care device or another hollow outer metal shell of a personal care device accessory like a loading station may be formed by applying hydraulic pressure onto an inside surface of a substantially tubular metal shell blank to form the outer metal shell having an intermediate section defining a maximum cross-sectional area and a pair of end portions arranged on opposite sides of said intermediate shell section and having smaller cross-sectional areas then said bulging intermediate section.

Another example of such undercut shape may include a substantially hemispherical concavity or bowl-like bulb portion closed to the outside of the shell and open to the interior thereof. Also plateau-like elevations of the outer side forming, for example a finger gripping portion or a support portion for an add-on element, may be formed open to the interior side of the metal shell in an undercut way.

Irrespective of the details of the shape of the outer metal shape, a metal shell blank having a hollow, sleeve-like or pipe-like shape may be positioned in a cavity of the mold which surrounds an outer side of the hollow metal shell blank, wherein the hydraulic pressure may be applied to an inner side of the hollow metal shell blank, thereby expanding the hollow metal shell blank and pressing the metal shell blank, with an outer side thereof, against the contour of the cavity of the mold so the outer side of the metal shell blank adopts the contour of the mold cavity.

Said hydraulic pressure forming step may be a hydroforming step, wherein the metal shell blank in the mold and/or the mold is filled with a hydraulic fluid such as water or oil, wherein pressure is applied to the hydraulic fluid from a pressure source outside the mold.

In addition to or in the alternative to such hydroforming step, an electro-hydraulic forming step may be provided, wherein the metal shell blank is positioned in a hydraulic fluid reservoir and/or submerged into the hydraulic fluid in which one or more pressure waves are generated by means of at least one pair of electrodes, said one or more pressure waves forming the metal shell blank into the desired shape of the outer metal shell. More particularly, such pressure waves may deform the metal shell blank in a mold to press the metal shell blank against a mold contour to adopt such mold contour.

In addition, or in the alternative to such hydroforming or electro-hydraulic forming step, the metal shell blank also may be deformed by electro-magnetic forming, wherein a metal shell blank made of a magnetically responsive material may be used and may be subject to a magnetic field that may be generated by an electro-magnetic device. More particularly, a magnetic field may be applied to the metal shell blank to transform said metal sheet blank into a viscoplastic state and to deform the metal shell blank to adopt a mold contour. Such electro-magnetic forming allows forming of complex shapes at high speeds in cold conditions.

The outer metal shell may be formed to have a one-piece structure. More particularly, the metal shell may be formed in one integral piece with a homogeneous seamless structure, wherein the outer metal shell may have a closed ring-like or closed sleeve-like shape so as to provide for high strength and rigidity due to the closed cross-section. Nevertheless, the ring-like or sleeve-like outer metal shell may have one or more lateral openings or lateral cutouts, wherein in the region of such cutouts there is of course no closed annular cross-section. However, the outer metal shell may be formed to have an annular cross-section with a closed ring-shape at least at opposite end portions of the outer metal shell, and/or at opposite sides of a lateral opening. Those axial end portions of the outer metal shell may, when considering the outer metal shell of the handle of the personal care device, face and support the function head of the personal care device on the one hand and may form the bottom end of the handle on the other hand. When considering the function head, the opposite end portions of the outer metal shell may, on the one hand, face the handle and on the other hand, may support the personal care treatment tools and/or may surround or neighboring the skin contact surface of the function head.

Such closed annular cross-sections at the end portions may provide for rigidity of the housing or frame, in particular a strong and rigid support for the functional elements mounted in and onto the outer metal shell. Nevertheless, the axial end sides of the metal shell themselves may be provided with openings which may be surrounded by said annular portions having closed annular cross-sections. For example, the support structure for supporting the function head is usually attached to or supported on one of the axial end portions of the handle so providing such end portion of the outer metal shell with a closed annular cross-section helps in supporting the function head rigidly.

Forming the outer metal shell by means of hydraulic pressure may be utilized to shape the substantially sleeve-like or ring-like outer metal shell to have laterally bulging portions with an increased diameter or an increased transverse extension, and various other sections of the outer metal shell to form undercuts, without having the problem to get out the punching elements or movable core elements known from mechanical die systems. Forming such undercuts by means of hydraulic pressure applied to the interior surface of the sleeve-like outer metal shell is no problem since the hydraulic fluid easily may be drained from the interior of the metal shell.

More particularly, the hydraulic pressure forming allows for tapering end portions at both axial ends of the outer metal shell and/or for a radially or laterally bulging intermediate shell section defining a maximum cross-sectional area of the outer metal shell. In particular, the diameter, or the transverse extension in case of non-circular or substantially rectangular or other non-uniform cross-sections, may get smaller to the axial end portions and/or may increase in one or more intermediate sections between the end portions. For example, the outer metal shell may form an elongated, sort of streamlined stick having a maximum thickness in a middle portion and tapering towards the end portions or may have a substantially egg-shaped configuration.

Other shapes with undercuts also may be desired. For example, it may be desirable to have at one lateral side of the outer metal shell, for example in a middle section, a bulging or elevated, plateau-like section so as to have additional space in the interior of the outer metal shell for accommodating a special functional element or, e.g., for arranging an input switch or a touch display at a laterally elevated position on the outer side of the metal shell. Another option is an elongated handle of organic contour having an outer side ergonomically adapted to the fingers and the palm of a closed hand.

When forming such expanded cross-sectional portions or radially bulging portions by applying hydraulic pressure onto the inner side of the metal shell, it may help to apply axial compression onto the metal shell blank, wherein such axial compression may be applied before and/or during and/or after the application of the hydraulic pressure. More particularly, such axial compression may help in pushing the material of the metal shell blank axially into the mold, thereby facilitating radial expansion of the metal shell blank, which axial expansion may be mainly achieved by the hydraulic pressure. Nevertheless, when the metal shell blank is radially expanded, axial compression helps the material to yield and provides for a sort of fresh supply of material to compensate for the radially expanding material.

So as to achieve such axial compression, an axial force may be applied to one axial end or to both axial ends of the metal shell blank, in particular to the end portion or end portions where hydraulic fluid or hydraulic pressure is supplied into the mold and/or into the sleeve-like or tubular metal shell blank. For example, a pair of pusher elements that may be arranged coaxial to each other, may push in opposite directions onto the opposite ends of the metal shell blank received in the mold so as to apply the axial compression. Such axial compression may be applied to the metal shell blank particularly during the application of the hydraulic pressure, at least partially overlapping with the period of hydraulic pressure forming.

The hydraulic pressure-forming step may be configured to produce more than one outer metal shell at the same time or in one hydraulic pressure-forming step. For example, a substantially tubular or sleeve-like metal shell blank with a length larger than the sum of lengths of two or more metal shells may be used, wherein such sufficiently long metal shell blank may be deformed in the hydraulic pressure-forming step to form, e.g., two outer metal shells with the desired shape which are still connected to each other immediately after the hydraulic pressure-forming step. The metal shell blank is deformed into a sort of row of outer metal shells connected to each other and arranged in a row one after the other. The plurality of formed shells may be arranged, with their main axes, coaxially to each other. In a subsequent cutting or separation step, the metal shells formed by hydraulic pressure may be separated from each other, e.g. by means of cutting the connection portion between two neighboring metal shells.

In particular, a pair of outer metal shells may be formed in one hydraulic pressure-forming step such that the metal shells have on orientation opposite to each other. For example, when the desired shape of the outer metal shell is a substantial egg shape, the two eggs may be formed in the mold by hydraulic pressure-forming such that the thicker ends of the eggs face each other and the thinner ends of the eggs face away from each other. Such opposite orientation of the pairs of metal shells to be formed, helps in achieving a uniform deformation of the material and uniform yielding of the material in the sections with large radial expansion.

As mentioned, the hydraulic pressure-forming step may be a hydroforming step. In the alternative, the hydraulic pressure-forming step may include electrohydraulic forming, wherein a shock wave or pressure wave is generated in the hydraulic fluid by means of at least one pair of electrodes to which electrical current is applied so a sort of explosion in the fluid is generated by the current. Such pressure wave going through the hydraulic pressure hits onto a surface of the metal shell blank, thereby causing deformation thereof. In particular, the metal shell blank may be pressed by such pressure wave against the wall of a mold in which the metal shell blank is received, substantially similar to the aforementioned hydroforming process.

In the alternative to hydroforming and electrohydraulic forming, the metal shell blank also may be deformed into the desired shape of the metal shell by means of electromagnetic forming which is sometimes known as EMF. For such EMF forming step, a metal shell blank is used which is made of a metal responsive to magnetic forces. On the other hand, for hydroforming or electrohydraulic forming, also other materials not responsive to magnetic forces can be used.

For example, aluminum shells may be used, or other materials such as brass, low-alloy steel and stainless steel may be used as metal shell blanks.

A particularly advantageous material for the outer metal shell is stainless steel which may include chromium, nickel, and molybdenum. More particularly, the steel may include 10-25 mass % Cr, 5-20 mass % Ni and 1-5 mass % Mo or 16-18 mass % Cr, 10-14 mass % Ni and 2-3 mass % Mo.

Preferably, one metal shell blank is used to create two or more outer shells comprising the forming step and cutting said formed part into two or more outer shell pieces. Thus, cost efficient mass production is possible.

For example, stainless steel of the type 1.4301 may be used or stainless steel 1.4404 may be used which provides for even further increased corrosion resistance.

Figure 2:
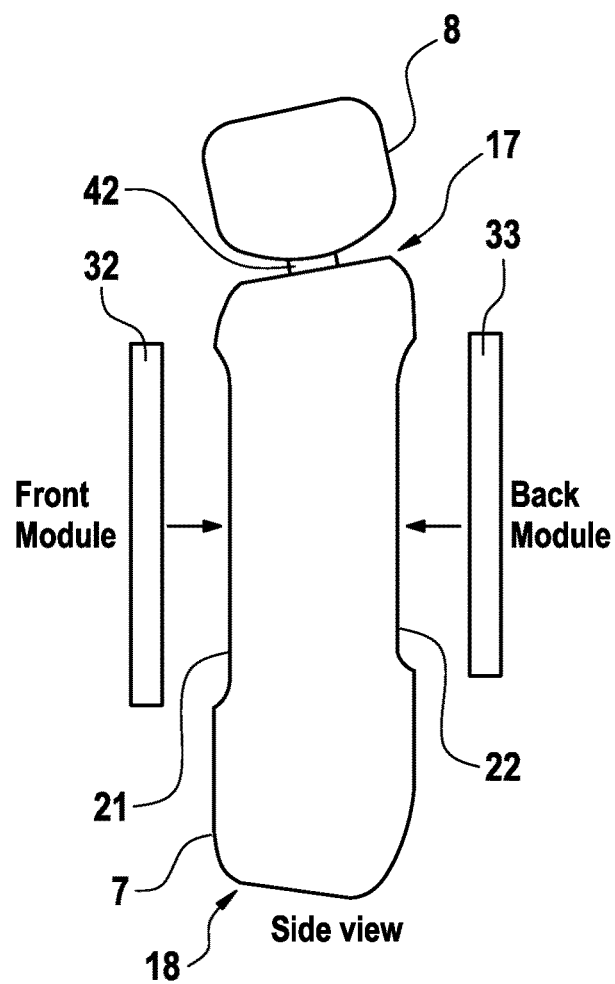
FIG. 2: a partially exploded, side view of the personal care device of FIG. 1, showing front and back modules removed from the outer metal shell of the handle.

As can be seen from FIGS. 1 and 2, the handheld personal care device 1 may be an electric shaver 2 comprising an elongated handle 3 and a function head 4 attached to one end of said handle 3, wherein said function head 4 may be a shaver head. The function head may form a separate part with separate housing shell relative to the handle and supporting arms 42 are provided connecting both the function head with the handle allowing to movably (e.g. to allow swivel and/or tilt movement) or non-moveably support the function head on the handle. Alternatively, the function head may be integral part of the handle, forming the top end of the device and both may be provided with an integral outer shell.

The function head 4 may include one or more functional components to perform or help to perform the personal care treatment. In case of a shaver head, the functional components of the function head 4 may include one or more cutting tools 13 which may include one or more of each a shear foil short hair cutter and/or a long hair cutter and/or a trimmer. The treatment tools may protrude from one side of the body of the function head 4 to define a skin contact surface.

Figure 11:
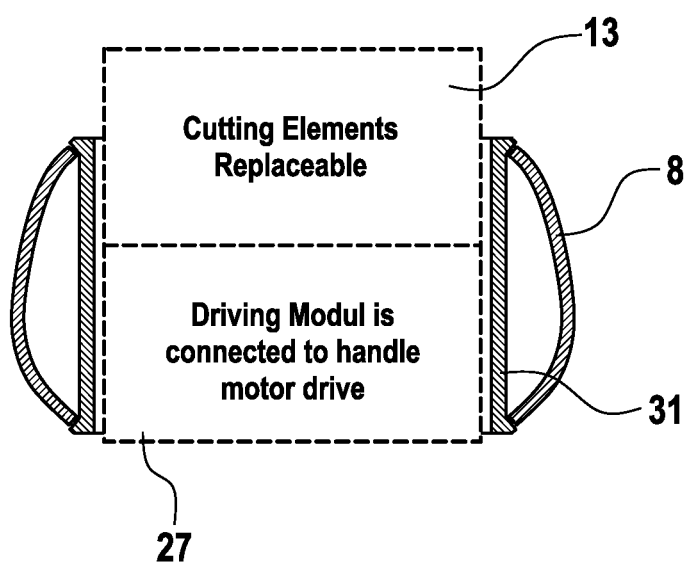
FIG. 11: a cross-sectional view of the function head of the personal care device of the preceding Figures, wherein a functional plastic chassis including functional elements such as cutting elements and a driving module is received inside an outer metal shell of the function head.

As can be seen from FIG. 11, the cutting tool 13 can be replaceable and thus, removably supported by a frame of the function head 4.

So as to activate and/or drive the treatment tools, a drive module may be received in the function head 4, wherein such drive module 27 may include an electric motor or, in the alternative, a transmitter or a coupling for coupling to another portion of the transmitter 12 coming from the handle 3.

The aforementioned functional components 9 of the function head 4 may be accommodated, at least partly, inside a housing 6 of the function head 4, wherein said housing 6 may include a metal shell 8 which is described in detail below.

The elongated handle 3 serves the purpose of gripping and holding the personal care device 1, wherein the outer peripheral surface of the handle 3 may be gripped by hand or by the fingers of a hand. In addition to such gripping function, the handle 3 also serves the purpose to accommodate further functional components 9 of the personal care device 1, wherein the functional components 9 of the handle 3 may include a drive unit 10 for driving the treatment tools 13 at the function head 4. More particularly, the drive unit 10 may include a motor 11 which may be driven by electric energy supplied by a battery 28 or via a net cable connected to a supply terminal.

The elongate handle 3 comprises a top end portion 17 adjacent to the functional head 4 and at the opposite side a bottom end portion 18. Each one of those end portions may be provided with frontal openings 17, 18. In an alternative, the outer shell 7 may be provided without an opening at the bottom end portion 18. At the lateral sides of the outer shell 7 at least one lateral opening 21, 22 is provided for accommodating therein a front and or back module 32, 33. Thus, each opening within the outer shell 7 is closed during assembly by a cap or module 32, 33, 35, 40 preferably made at least in part from plastic.

To control the action of the motor 11, the handle 3 may include a control unit which may include electronic components such as an electronic controller. More particularly, the control unit may include a printed circuit board or PCB to which the motor 11 is connected, wherein on the other hand input/control means such as a control switch, a touch screen or other control elements may be connected to the PCB 30 or, more generally, to the electronic control unit.

Figure 3:
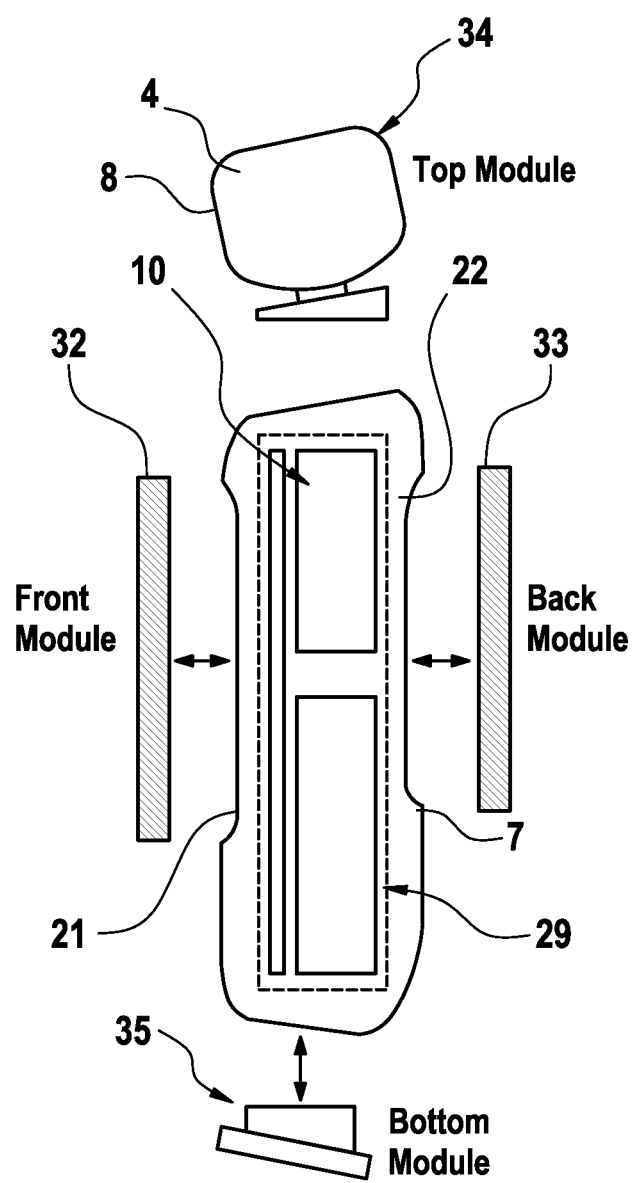
FIG. 3: an exploded side view of the personal care device similar to FIG. 2, showing the functional component assembly received inside the outer metal shell of the handle.
Figure 4:
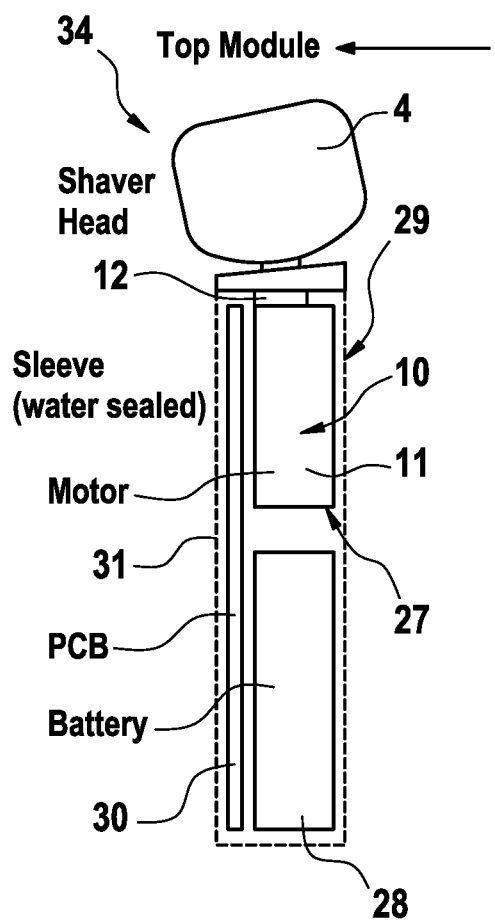
FIG. 4a-4b: a partially exploded side view of the personal care device similar to FIG. 3, wherein partial view (a) shows the functional component assembly to be received inside the outer metal shell of the handle and the function head in terms of the shaver head attached thereto, and partial view (b) shows the functional component assembly received inside the outer metal core with the function head attached thereto, wherein back and front modules are shown removed from the front and back sides of the outer metal core.
Figure 4:
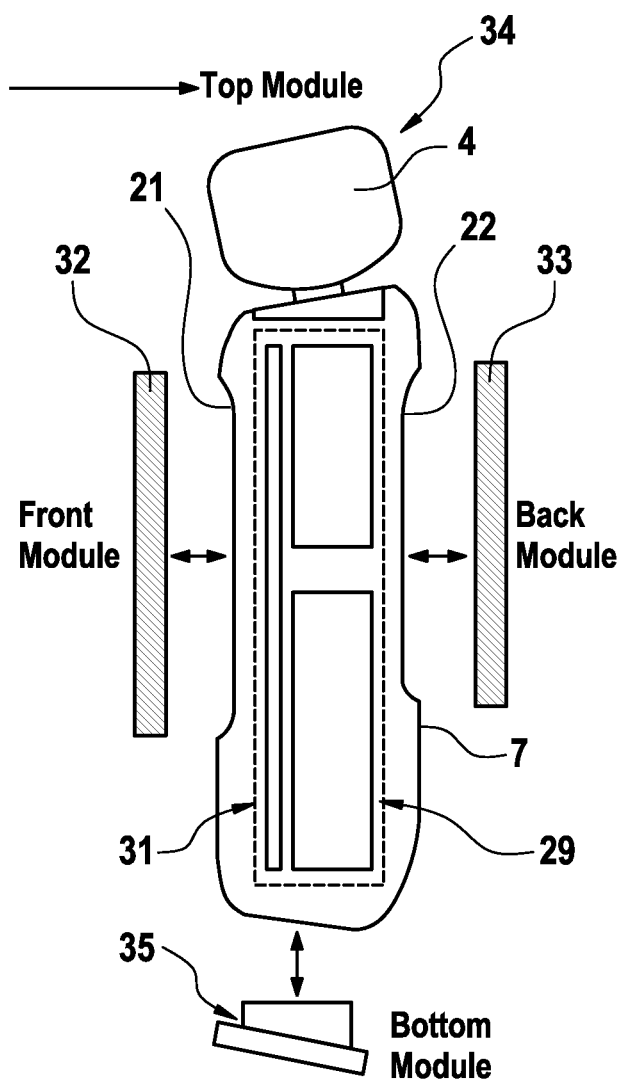
Figure 5:
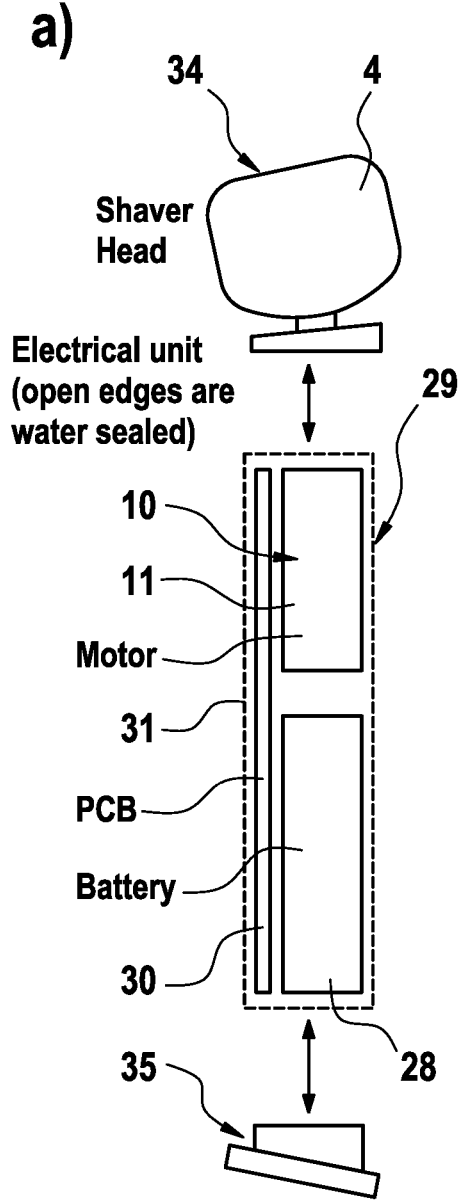
FIG. 5a-5b: an exploded side view of the personal care device similar to FIG. 4, wherein partial view (a) shows the functional elements assembly without the outer metal shell, wherein the function head and a bottom module connectable to said functional elements assembly are shown in positions removed from said functional element assembly, and wherein partial view (b) shows the functional elements assembly received in the outer metal shall with the connectable function head, bottom module, and front and back modules removed from the outer metal shell and the functional elements assembly.
Figure 5:
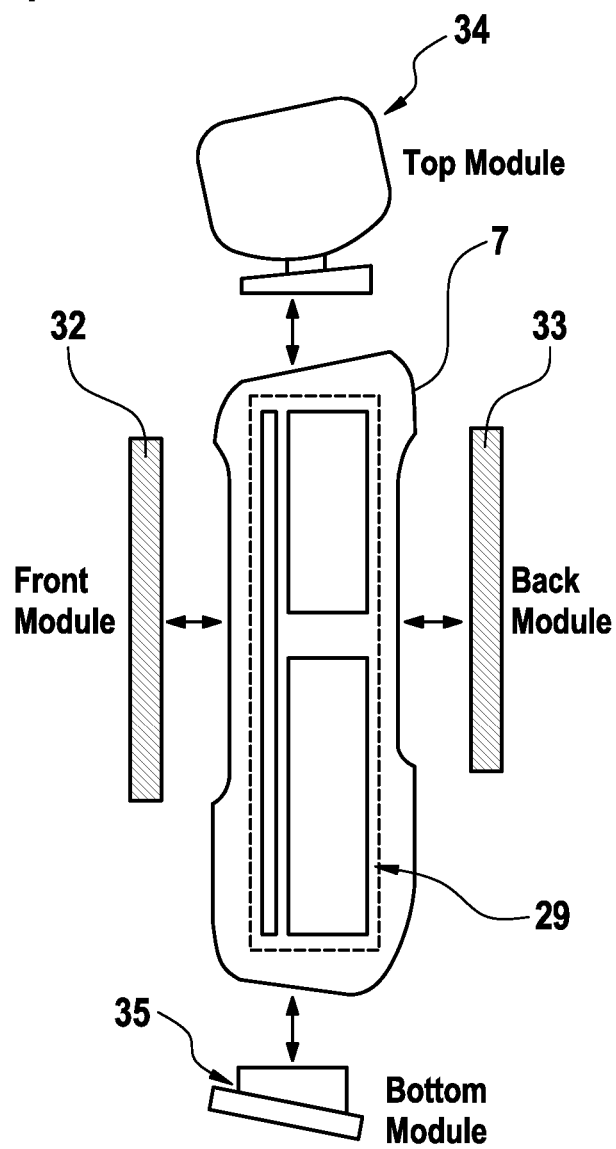

As can be seen from FIGS. 3 to 5, the elongated handle 3 may comprise a substantial hollow housing 5 in which the aforementioned function components 9 may be received and accommodated. Said housing 5 of the handle 3 may include a metal shell 7 forming, at least in part, the outer surface of the handle 3.

The functional components 9 received in the handle 3 may be preassembled to form a preassembled mounting unit. For example, the functional elements 9 may be premounted to a chassis element 31 which may be, at least in part, made from plastic, for example. The aforementioned chassis element 31 also may include the aforementioned printed circuit board 30 to which other elements like the motor, the battery or control switches or displays may be mounted or connected.

Figure 6:
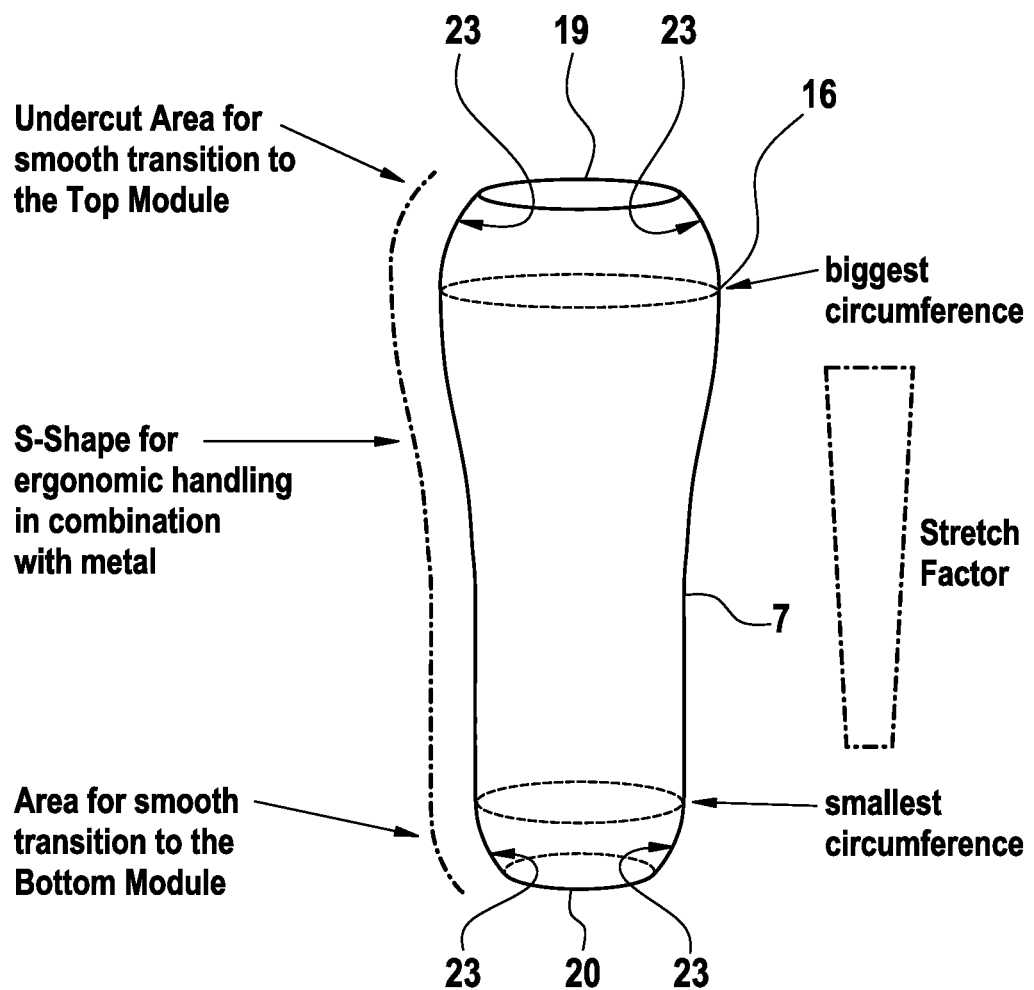
FIG. 6: a front view of the outer metal shell of the handle of the personal care device of the preceding Figures, wherein the outer metal shell is shown without cutouts therein to better illustrate the stretch factor.

As illustrated by FIGS. 3 to 5, the functional elements 9 may be differently grouped into preassembled mounting modules. According to an advantageous aspect, the personal care device 1 may be configured to have an elongated inner functional module 29 which may be inserted into the handle 3 via an opening in one of the axial ends of the housing 5. For example, an axial top end portion of the handle 3 facing the function head 4 may be provided with a frontal end opening 19, cf. FIG. 6, through which the elongated inner functional module 29 may be inserted into the handle 3. The elongated inner functional module 29 may include, e.g., the motor 11, the battery 28, the electronic control unit for controlling the motor 11, which control unit may include the printed circuit board 30. The inner functional module 29 may have a sealing or a sealed configuration protecting the electronic components and also the motor and battery against moisture and water.

The inner functional module 29 also may include a transmitter 12 for transmitting the driving motion of the motor 11 to the treatment tools 13 at the function head 4, wherein a part of the transmitter 12 may project from an axial top end portion of the handle 3 into or towards the function head 4.

As can be seen from FIGS. 3 to 5, front and/or back modules 32, 33 may be mounted on lateral sides of the handle 3, wherein also such front module 32 and/or back module 33 may be connected to the interior functional components 9 received in the interior of the handle 3. To allow connection of the front module 32 and the back module 33 to the internal components, the housing 5 of the handle 3 and more particularly, the outer metal shell 7 thereof, may be provided with lateral cutouts or openings 21, 22 in or through which the front and back modules 32, 33 may extend at least partly.

The front and back modules 32, 33 may include electronic and/or electrical components and/or mechanical components and/or tools, wherein the front and back modules 32, 33 may include portions made from plastic and/or portions made from other materials than metal, such as glass, wherein nevertheless some other portions may be formed from metal. For example, the front module 32 may include a display such as a touch display for inputting control commands and/or displaying control information such as, e.g., treatment time or battery charge status. In addition, or in the alternative, the front module 32 also may include control elements such as a control switch and/or an output element such as a sound generator or loudspeaker.

The back module 33 may include, e.g., a battery module which may be configured exchangeable. Such additional battery module may be provided in addition to the battery 28 received inside the handle 3 so as to, e.g., have a range extender, or it may replace the battery 28 inside the handle 3. In addition, or in the alternative, the back module 33 may include other functional components 9 such as a special treatment tool 13. In case of a shaver 2 or hair cutter, such special treatment tool 13 may include a long hair cutter.

As can be seen from FIGS. 3 to 5, a bottom module 35 may be attached to the handle 3 at an axial end portion opposite to the function head 4, wherein the handle 3, more particularly the housing 5 thereof and more particularly the metal shell 7 of the handle's housing 5 may be provided with a frontal opening 19 into which the bottom module 35 may be inserted at least partly. Such bottom module 35 may be made, at least partly, from plastics and/or may include electronic components such as a connection terminal for connecting a supply cable and/or connecting the charger pins or charging connectors of a charger station. The bottom module 35 also may include data connection terminals to connect the personal care device 1 to a data sending/receiver station.

A top module 34 may be formed by the aforementioned function head 4, wherein such top module 34 may be permanently or removably attached to the top end portion of the handle 3. More particularly, a base portion of the top module 34 which may support a body and/or the functional components 9 of the function head 4, may be inserted, at least in part, into the hollow housing 5 of handle 3 and/or may be attached to the axial end portion of the handle 3. More particularly, said base portion of the top module 34 may be attached to the metal shell 6 of the handle 3 to connect the functional components 9 of the function head 4 to the functional components 9 of the handle 3. The top module 34 may be rigidly attached to the metal shell 7 of the handle 3, wherein such rigid attachment may be fixed or releasable, cf. FIG. 3, FIG. 4, and FIG. 5.

Figure 7:
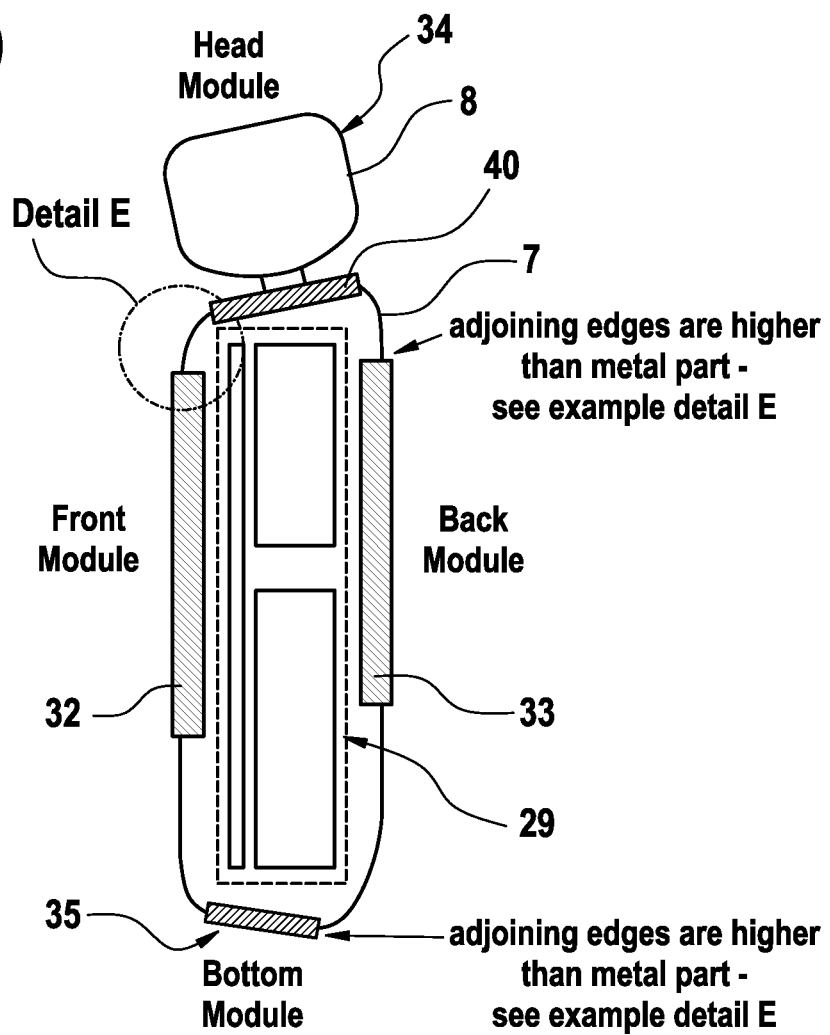
FIG. 7a-7b: a partially cross-sectional side view of the personal care device similar to FIG. 3, wherein partial view (a) shows the outer metal shell with the functional elements assembly accommodated therein and the front, back, bottom and head modules attached thereto, and wherein partial view (b) shows an enlarged cross-sectional view of the portion marked "E" of the handle of the personal care device showing the interfaces between the outer metal shell and the head module and the front module to illustrate the front and head modules having protrusions projecting beyond the outer surface of the outer metal shell.
Figure 7:
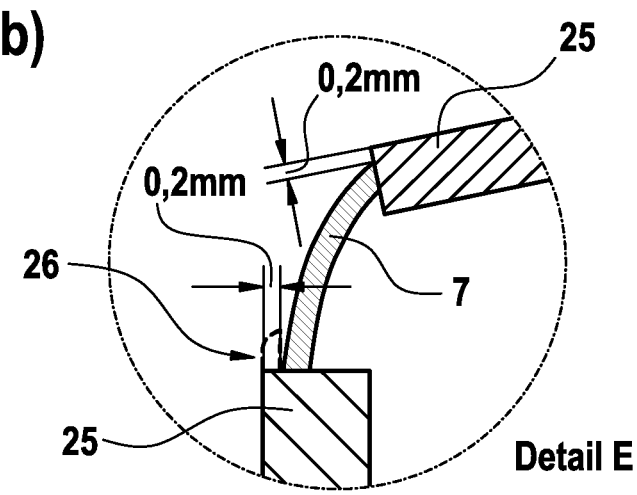

As can be seen from FIG. 7, at least one of the aforementioned functional modules 29, 32 to 35 may be inserted into the respective cutout or opening 19, 20 or 21 in the metal shell 7 or handle 3 such that the at least one module 29, 32 to 35 extends partly inside and partly outside the housing 5 of handle 3 and more particularly partly inside and partly outside the metal shell 7. More particularly, at least one of the modules 29, 32 to 35 may be configured to have a protrusion 25 which extends through the corresponding opening 19, 20, 21 in the metal shell 7 with an outer portion of the protrusion 25 projecting beyond an outer surface of the metal shell 7 towards the outside of handle 3, cf. partial view (b) of FIG. 7.

For example, at the interface between the metal shell 7 and the function module, said protrusion 25 may project beyond the outer surface of the metal shell 7 by an amount ranging from 0.05 to 1 mm or 0.1 to 0.5 mm or 0.1 to 0.3 mm Such projection forms a sort of protector which protects skin and fingers from contacting the edges of the openings, 19, 20 and 21.

Nevertheless, in the alternative, the functional modules 32 to 35 may be inserted into the corresponding openings 19, 20, 21 in a flush way so the aforementioned amount of projection would be substantially zero, wherein it also would be possible to have a slight negative projection of, e.g., −0.1 to −0.5 mm.

As can be seen from FIG. 7 (*b*), the at least one functional module 29, 32 to 35 may tightly fit into the corresponding opening 19, 20 and 21, wherein the outer peripheral surface of the module 32 to 35 may match the corresponding opening 19, 20, 21 in terms of shape and dimension. More particularly, the aforementioned protrusion 25 extending through the opening may have a peripheral shape adapted to the contour of the respective opening 19, 20, 21 to achieve a tight fit or allow sealing therebetween.

As can be seen from FIG. 7 (b), the protrusion 25 may have a basically cylindrical shape so the outer portion of the protrusion 25 may extend substantially perpendicular or transverse to the outer surface of the metal shell 7. In the alternative, the protrusion 25 may include a collar 26 having a slightly larger diameter or dimension or extension than the protrusion's portion sitting in the opening 19, 20, 21. Such collar 26 may be seated onto the outer surface of the metal shell 7.

The aforementioned protrusion 25 of the respective functional module 29, 32 to 35 which is seated into the corresponding opening 19, 20 and 21 may be formed from plastic at least in part, wherein such plastic may be hard plastic or soft plastic or a mixture thereof to combine, e.g., snap-fitting the respective module into the corresponding opening with sealing the interface between the metal shell 7 and the attached module.

Figure 12:
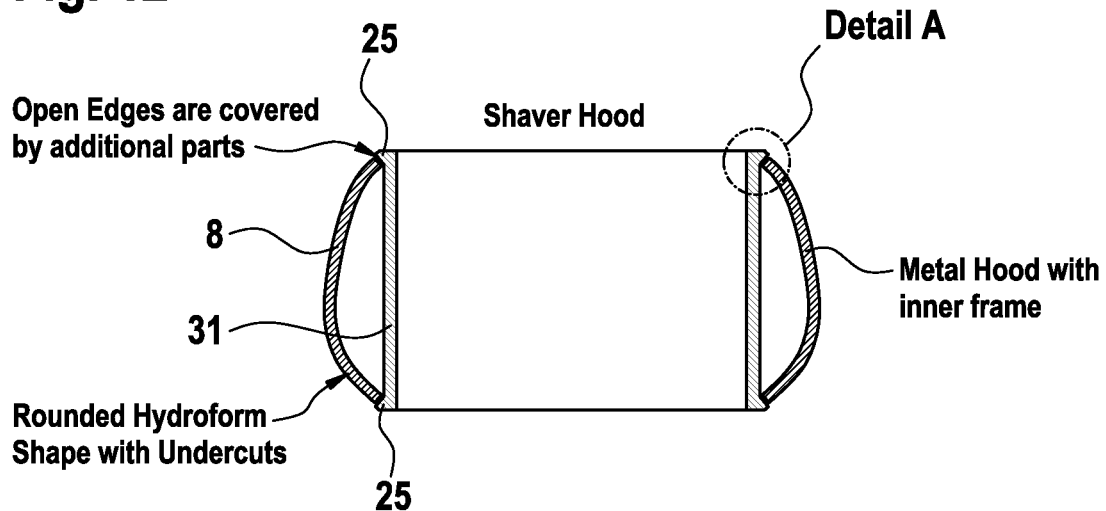
FIG. 12: a cross-sectional view of the function head similar to FIG. 11, showing the interfaces between the functional chassis element and the outer metal shell of the function head.
Figure 13:
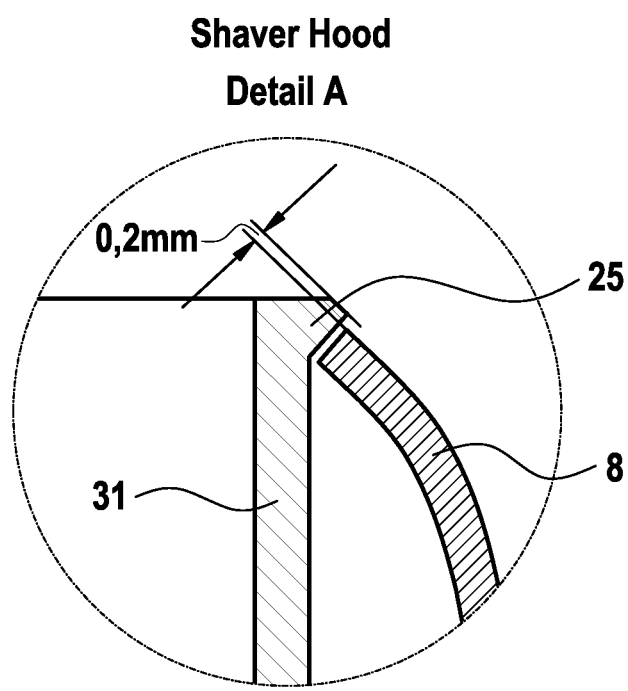
FIG. 13: an enlarged cross-sectional view of the region marked "A" of the function head of FIG. 12, illustrating the plastic chassis element having a protrusion projecting beyond the outer surface of the outer metal shell of the function head.

As can be seen from FIGS. 11 to 13, the function head 4 may have a similar configuration of the function head housing 6 and the functional modules or functional components 9 attached thereto. More particularly, the functional components or groups of components 9 may be inserted into the interior of the housing 6 of function head 4 at least in part. More particularly, the functional components 9 may include a protrusion 25 which projects beyond an outer surface of the metal shell 8 of the head's housing 6 to the outside thereof, wherein the amount of projection, cf. FIG. 13, may range from 0.05 to 1 mm or 0.1 to 0.5 mm or 0.1 to 0.3 mm Again, as described for the functional modules of the handle 3, no difference in height to achieve a flush configuration or a negative difference in height basically would be possible.

The protrusion 25 of the chassis element attached to the function head 4 also may be formed from plastics at least in part, wherein such plastic may be hard plastic and/or soft plastic to achieve snap-fitting and/or sealing.

The metal shell 7 of the handle 3 and/or the metal shell 8 of the function head 4 may be hydroformed. More particularly, manufacturing of the metal shell 7, 8 may include a hydro-forming step which includes application of high pressure hydraulic fluid onto an inner surface of a metal shell blank 14, as it is illustrated in greater detail in FIGS. 8 and 9.

Figure 8:
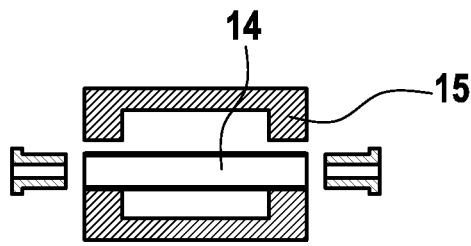
FIG. 8a-8e: a schematic illustration of the process steps of the hydroforming of the outer metal shell of the personal care device of the preceding Figures, wherein partial view (a) shows inserting the metal shell blank into an open mold, partial view (b) shows the metal shell blank in the closed mold before applying hydraulic pressure, partial view (c) shows the tubular metal shell blank filled with hydraulic fluid immediately before hydroforming, partial view (d) shows the application of hydraulic pressure into the interior of the tubular metal shell blank into the cavity of the mold, wherein axial compression is applied to the metal shell blank during application of the hydraulic pressure, and partial view (e) shows removal of the hydroformed outer metal shell having the desired shape from the opened mold.
Figure 8:
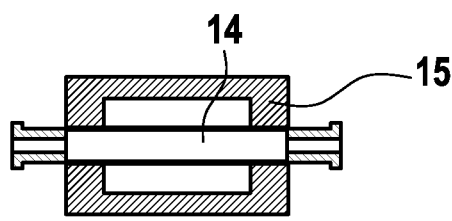
Figure 8:
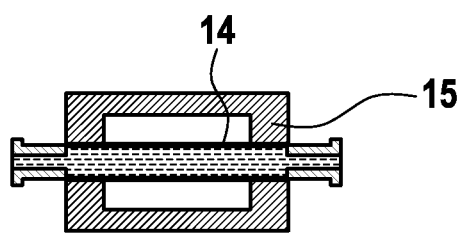
Figure 8:
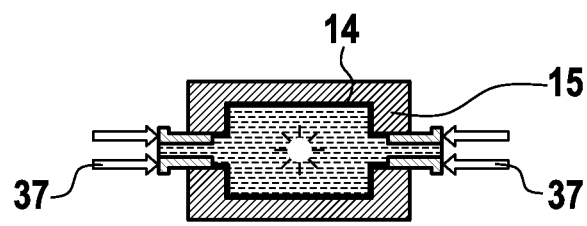
Figure 8:
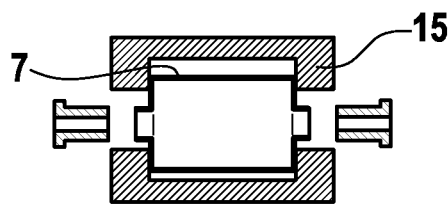
Figure 9:
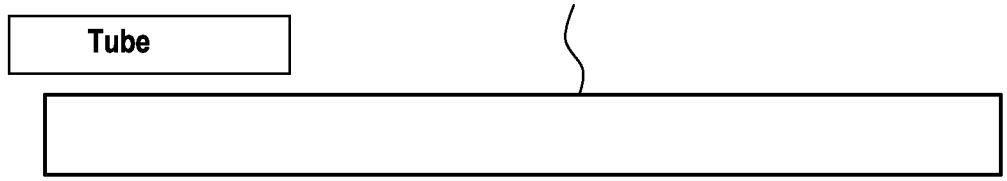
FIG. 9a-9d: a side view of the tubular metal shell blank and the shaped metal shell, respectively, at different stages of forming the outer metal shell, wherein partial view (a) shows the undeformed tubular metal shell blank, partial view (b) shows the deformed metal shell blank after the hydroforming step, said deformed metal shell blank comprising two outer metal shells in the desired shape thereof, partial view (c) shows cutting the deformed metal shell of step (b) into several parts including two outer metal shells, and partial view (d) shows the obtained two outer metal shells with lateral cutouts.
Figure 9:
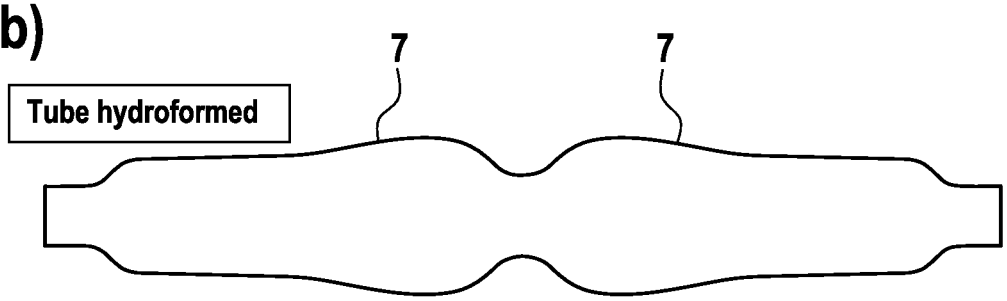
Figure 9:
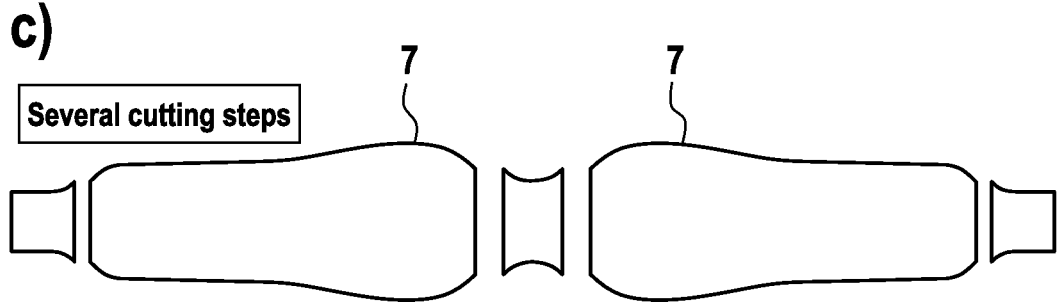
Figure 9:
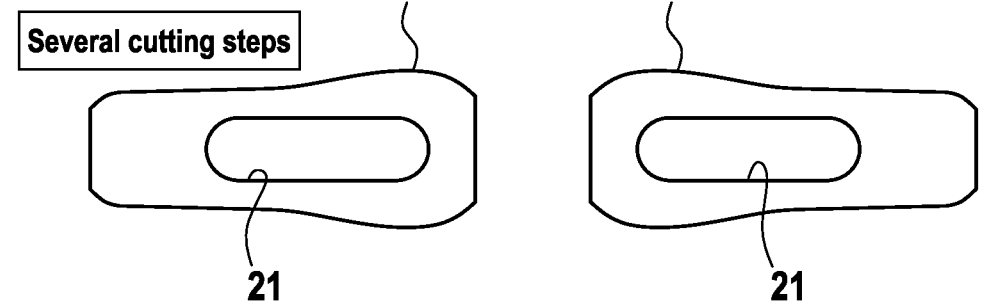

Referring to FIG. 8, the metal shell blank 14 which initially may have a tubular shape, is inserted into an open mold 15 which may define, when closed, a cavity corresponding to the desired shape of the outer side of the metal shell 7, 8. As can be seen from FIG. 8a, the metal shell blank 14 may be inserted such that opposite end portions of the tubular blank 14 reach opposite edge portions of the mold 15 at the interface of two mold parts. The end portions of the tubular metal shell blank 14 should be accessible from outside the mold 15 to allow supply of hydraulic fluid into the interior of the tubular metal shell blank 14. In addition, pusher elements 37 should be able to contact the opposite end portions of the tubular metal shell blank 14 to apply axial compression thereto.

When closing the mold 15, cf. FIG. 8b, and connecting the fluid supply connectors to the end portions of the tubular metal shell blank 14 and/or positioning the pusher elements 37 at said end portions of the tubular metal shell blank 14, hydraulic fluid is injected into the interior of the tubular metal shell blank 14 via the open axial ends thereof, cf. FIG. 8c to completely fill the interior of the metal shell blank 14, cf. FIG. 8c.

Hydraulic pressure is then increased to achieve deformation of the metal shell blank 14 and more particularly, radial expansion thereof so as to press the metal shell blank 14 against the mold surfaces defining the cavity of the mold 15 so the metal shell blank 14 may adopt the shape of the mold cavity, cf. FIG. 8d.

Before and/or during and/or after radial expansion of the metal shell blank 14 due to hydraulic pressure, the aforementioned pushers 37 may be activated to apply axial compression onto the metal shell blank 14. More particularly, the pusher elements 37 may be pressed against the opposite end portions of the tubular metal shell blank 14, cf. FIG. 8d to support the desired deformation of the material of the metal shell blank 14.

The axial compression may be applied when the metal shell blank 14 is in the mold 15.

FIGS. 9a and b illustrate the transition and deformation of the metal shell blank 14 into the outer metal shell 7, 8 having the desired shape. According to an advantageous aspect, a pair of metal shells 7, 8 may be formed in one hydro-forming or hydraulic pressure forming step, cf. FIG. 9b, wherein the mold 15 may be configured to achieve hydro-forming or hydraulic pressure forming of a pair of outer metal shells 7, 8 oriented opposite to each other. As can be seen from FIG. 9b, for example, the two metal shells 7, 8 may face each other with their thicker end portions, whereas the thinner end portions may face away from each other, wherein the two metal shells may be arranged, with their main axes, substantially coaxially to each other.

After the hydro-forming step, the metal shell or pair of metal shells may be removed from the mold to effect one or more cutting steps. In particular, axial end portions of the formed metal shell 7, 8 may be cut-off, cf. FIG. 9c. Such cutting step may include different cutting techniques such as laser cutting, sawing and/or milling.

As becomes apparent from FIG. 9c, the aforementioned frontal openings 19, 20 at the axial end portions of the metal shell 7, 8 are made by means of such cutting the end portions.

As illustrated by FIG. 9d, also one or more lateral openings 21 may be cut into the metal shell 7, 8 to allow for mounting the aforementioned front and back modules 32, 33. As an aside, it should be noted that also other lateral openings can be cut into the lateral sides of the outer metal shell 7, 8. For example, perforations may be cut or drilled to allow for visual contact to components inside the metal shell such as a display or LEDs etc.

Figure 10:
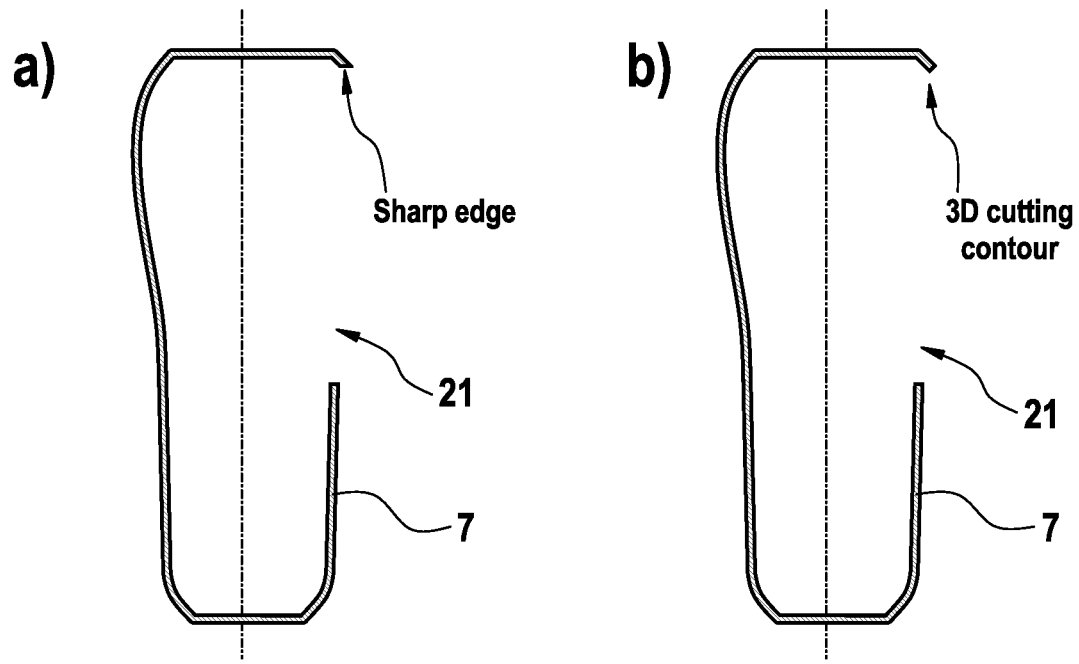
FIG. 10a-10b: a cross-sectional view of the outer metal shell of FIG. 9, illustrating the lateral cutout, wherein partial view (a) shows the lateral cutout having a sharp edge and partial view (b) shows the cutout having a three-dimensional edge extending perpendicular to the outer surface of the three-dimensionally shaped metal shell section surrounding the cutout.

As illustrated by FIG. 10, the openings 19, 20, 21 or cut-outs can be performed in different ways and by different cutting technologies. For example, as shown by FIG. 10a, the openings may have a sharp edge and/or an edge contour having a substantial cylindrical configuration in terms of a parallel extension of all sections of the cut-out edge. Such configuration may be achieved, for example, by drilling a hole or moving another cutting tool like a saw or a milling tool in a fixed orientation relative to the metal shell 7, 8. For example, the metal shell 7, 8 may be fixedly held in a horizontal orientation, whereas the milling tool is fixedly held in a vertical orientation and moved in a horizontal plane to effect machining of the desired cut-out contour.

In the alternative, as illustrated by FIG. 10b, the opening or cut-out may be manufactured by means of 3D-cutting, wherein the orientation of the cutting tool is adjusted or varied along the displacement path of the cutting tool, so the edge of the obtained opening has different orientation in different sectors of the opening.

More particularly, such 3D-cutting may be configured to adjust the orientation of the cutting tool to the inclination and/or orientation and/or slope of the outer surface of the metal shell section in which the cut is made. More particularly, the orientation of the 3D-cutting tool can be adjusted such that the edge of the obtained opening is substantially perpendicular to the outer surface of the metal shell neighboring to or encompassing the opening, cf. FIG. 10b, wherein such outer surface neighboring the opening may change its orientation along the opening and/or may have a curved shape such as a barrel-shape or may have a multi-axially curved contour. By this, sharp edges at the metal shell outer side are avoided. "Substantially perpendicular" in this context means an angle between the outer side of the outer shell and the edge side of the opening being in a range of 70-120 degree or more preferably an angle in the range between 80 and 100 degrees.

For example, such 3D-cutting may include laser cutting with a laser cutter that can be pivoted about two or three axes, wherein translatoric displacement of the laser being relative to the metal shell may be achieved by translation of the fixture holding the metal shell during the cutting process and/or translation of the laser cutter. It also would be possible to pivot the fixture holding the metal shell to achieve 3D-cutting and to adapt the orientation of the laser being relative to the slope or orientation of the metal shell surface.

Such 3D-cutting also may use other cutting techniques such as milling or water jet cutting.

Figure 14:
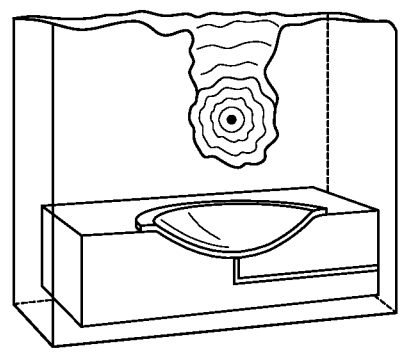
FIG. 14: an illustration of the machinery for forming the outer metal shell of the personal care device of the preceding Figures by means of electrohydraulic forming.

As can be seen from FIG. 14, the hydraulic pressure forming step for forming the metal shell 7, 8 also may include electro-hydraulic forming which is sometimes known as EHF. Such electro-hydraulic forming is based on ultra-high speed deformation of the metal shell blank using shock waves or pressure waves in hydraulic fluid such as water. Via discharging current, an electric arc may be generated in water between at least one pair or electrodes. Such electric arc vaporizes the surrounding water and/or hydraulic fluid, converting electrical energy into a high pressure wave of mechanical energy. Such shock wave may simultaneously transform the metal shell blank 14 into a viscoplastic state and press and/or accelerate the metal shell blank 14 onto the surface of the mold's cavity, thereby forming the desired shape at high speeds in cold conditions. Such electro-hydraulic forming is particularly able to form complex shapes.

Figure 15:
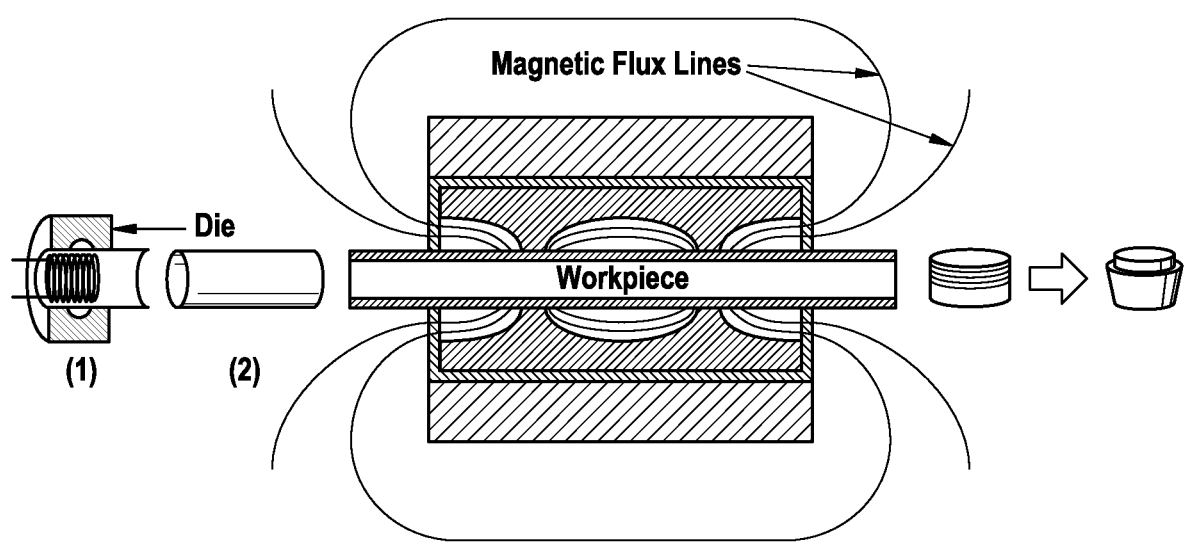
FIG. 15: an illustration of the machinery for forming the outer metal shell of the personal care device of the preceding Figures by means of electromagnetic forming.

As illustrated by FIG. 15, the forming step for forming the outer metal shell 7, 8 into the desired shape, also may use electro-magnetic forming known as EMF. Such electro-magnetic forming is based on the ultra-high speed deformation of metal using a magnetic field. Via discharging current in a coil for example, a magnetic field may be generated which may simultaneously transform the metal shell blank into a viscoplastic state and press/accelerate the metal shell blank onto the surface of the mold cavity, thereby forming the metal shell into the desired shape at high speeds in cold conditions. Also, such electro-magnetic forming is able to form complex shapes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited.

The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. Method of manufacturing a hair cutter with an outer metal shell, comprising the steps of
forming the outer metal shell into one integral piece with a homogenous, seamless structure and a hollow, elongated, closed-ring or closed-sleeve shape,
wherein said forming step includes positioning a hollow, metal shell blank in a cavity of a mold surrounding an outer side of said metal shell blank, wherein a hydraulic pressure is applied to an inner side of the hollow metal shell blank, thereby expanding the hollow metal shell blank and pressing the metal shell blank, with an outer side, against the contour of the cavity of the mold so the outer side of the metal shell blank adopts the contour of the mold,
creating frontal openings at opposite axial end portions,
mounting functional components and/or modules for performing or helping to perform a personal care function into and/or onto said formed outer metal shell, and wherein the outer metal shell is formed with an intermediate section between the opposite end portions, the intermediate section including at least two lateral openings and/or lateral perforations for accessing or connecting with the functional components, the at least two lateral openings being formed after the hydraulic pressure is applied to expand the hollow metal shell blank and being open in a direction transverse to the frontal openings.

2. Method according to claim 1, wherein said hydraulic pressure-forming step is a hydroforming step, wherein the metal shell blank in the mold and/or the mold is filled with a hydraulic fluid such as water, wherein pressure is applied to said hydraulic fluid from a pressure source outside the mold.

3. Method according to claim 1, wherein said hydraulic pressure forming step is an electrohydraulic forming step, wherein the metal shell blank is positioned in a hydraulic fluid reservoir in which one or more pressure waves are generated by at least one pair of electrodes, said one or more pressure waves forming the metal shell blank into the desired shape of the outer metal shell.

4. Method according to claim 1, wherein said outer metal shell is formed with at least one undercut portion, by said hydraulic pressure.

5. Method according to claim 1, wherein said outer metal shell is formed with said axial end portions having closed annular cross-sections surrounding the openings.

6. Method according to claim 1, wherein said functional components or modules comprises at least three, four, five or all of the following: a drive unit, charging connectors provided at a bottom end portion, charging connectors provided at the lateral opening, a display provided at a lateral opening, a hair cutting tool provided at a top end portion and/or a special treatment tool provided at the lateral side or the bottom end of the outer metal shell.

7. Method according to claim 1, wherein said outer metal shell is formed, by said hydraulic pressure, such that the intermediate section comprises a bulging intermediate section defining a maximum cross-sectional area of the outer metal shell and the two opposite end portions each defining the frontal openings having cross-sectional areas smaller than the maximum cross-sectional area defined by said bulging intermediate section.

8. Method according to claim 1, wherein the metal shell blank is subject to axial compression in said mold before and/or during and/or after applying the hydraulic pressure to facilitate transverse deformation of the metal shell blank.

9. Method according to the claim 8, wherein said axial compression is applied onto opposite end portions of the metal shell blank at least partly overlapping in time with the application of the hydraulic pressure.

10. Method according to claim 8, wherein said axial compression is applied to end portions of the metal shell blank extending outside the mold cavity by pushers positioned outside the mold and movable relative to the mold.

11. Method according to claim 1, wherein at least one opening having a three-dimensional edge contour is cut into the outer metal shell in a 3D cutting step, said three-dimensional edge contour being substantially perpendicular or being in a range between 70 to 110 degree to the outside shell portion of the outer metal shell neighboring and surrounding said opening along the entire contour of the opening, said shell portion neighboring and surrounding said opening having a varying orientation changing along the opening.

12. Method according to claim 11, wherein said 3D cutting step includes laser cutting.

13. Method according to claim 1, wherein at least one surface treatment step including at least one of the following: brushing, shot blasting, grit blasting, ball peening, coating, plating, varnishing and chemically edging, is applied to the outer metal shell after the hydraulic pressure forming step.

14. Method according to claim 1, wherein the metal shell blank is made from stainless steel or a steel containing chromium, nickel, and molybdenum, particularly 10-25 mass % Cr, 5-20 mass % Ni and 1-5 mass % Mo or 16-18 mass % Cr, 10-14 mass % Ni and 2-3 mass % Mo.

15. Method according to claim 1, wherein one metal shell blank is used to create two or more outer shells comprising the forming step and cutting said formed part into two or more outer shell pieces.

16. Method of manufacturing a hair cutter with an outer metal shell, comprising the steps of forming the outer metal shell into one integral piece with a homogenous, seamless structure and a hollow, elongated, closed-ring or closed-sleeve shape, wherein said forming step includes positioning a hollow, metal shell blank in a cavity of a mold surrounding an outer side of said metal shell blank, wherein a hydraulic pressure is applied to an inner side of the hollow metal shell blank, thereby expanding the hollow metal shell blank and pressing the metal shell blank, with an outer side, against the contour of the cavity of the mold so the outer side of the metal shell blank adopts the contour of the mold, creating frontal openings at opposite axial end portions and at least one lateral opening or perforation at an intermediate side portion at the formed outer metal shell, mounting functional components and/or modules for performing or helping to perform a personal care function into and/or onto said formed outer metal shell, and wherein at least one functional component or module projects partly inside and partly outside the formed metal shell, the at least one lateral opening being formed after the hydraulic pressure is applied to expand the hollow metal shell blank and being open in a direction transverse to the front openings.

17. Method of manufacturing a hair cutter with an outer metal shell, comprising the steps of forming the outer metal shell into one integral piece with a homogenous, seamless structure and a hollow, elongated, closed-ring or closed-sleeve shape, wherein said forming step includes positioning a hollow, metal shell blank in a cavity of a mold surrounding an outer side of said metal shell blank, wherein a hydraulic pressure is applied to an inner side of the hollow metal shell blank, thereby expanding the hollow metal shell blank and pressing the metal shell blank, with an outer side, against the contour of the cavity of the mold so the outer side of the metal shell blank adopts the contour of the mold, creating frontal openings at opposite axial end portions, mounting functional components and/or modules for performing or helping to perform a personal care function into and/or onto said formed outer metal shell, and wherein said outer metal shell is formed with an intermediate section between the opposite end portions, the intermediate section including at least two lateral openings, the functional components and/or modules comprise front and back modules which extend at least partly through two of the lateral openings, the at least two lateral openings being formed after the hydraulic pressure is applied to expand the hollow metal shell blank and being open in a direction transverse to the frontal openings.

* * * * *